Dec. 24, 1968   L. W. PARKER   3,418,506
AXIAL AIRGAP MOTORS AND GENERATORS
Filed March 29, 1965

INVENTOR
Louis W. Parker

BY Hall, Pollock & VandeSande

ATTORNEYS

൩,൪൧൮,൫൦൬

United States Patent Office 3,418,506
Patented Dec. 24, 1968

3,418,506
AXIAL AIRGAP MOTORS AND GENERATORS
Louis W. Parker, 2309 N. Dixie Highway,
Wilton Manors, Fla. 33305
Filed Mar. 29, 1965, Ser. No. 443,258
10 Claims. (Cl. 310—268)

ABSTRACT OF THE DISCLOSURE

An axial airgap machine is provided with at least three stator sections and at least two rotor sections surrounding the main axis of the machine and spaced from one another in the axial direction. The stator sections comprise wound and unwound stators disposed alternately relative to one another, and relative to said rotor sections, along the axis of the machine. The rotor sections are interposed respectively between said wound and unwound stator sections so that each rotor section has a wound stator section on one side thereof, and an unwound stator section on the other side thereof.

---

The present invention relates to dynamo-electric machines, and more particularly to electric motors and generators of the axial airgap types; and is especially concerned with machines of this general type which are simpler to construct, and which may be made smaller and lighter than prior such electric machines by making more efficient use of the materials composing the machines.

In my prior U.S. Patent No. 2,479,589, I have described the principle of axial airgap motors and generators, as well as a simple way to construct such machines. One of the principal features of such a machine is its small physical size and weight as compared to conventional machines of similar performance. In my subsequent Patent No. 2,734,140 for "Axial Airgap Motors and Generators," improved forms of such machines were also described. Inasmuch as the fundamental principles of axial airgap motors and generators are in themselves well known, and are set forth in my prior patents, a description of these fundamentals will not be given here; and my said prior patents are incorporated herein by reference for a discussion of the general structural arrangement and operation of such machines.

Machines of the general types here involved, particularly when they take the forms described in my Patent No. 2,734,140, are physically smaller in size and of less weight than conventional machines exhibiting similar performance characteristics. In general, the machines comprise a plurality of spaced stator portions associated with a plurality of spaced rotor portions interleaved between said stator portions. The rotor and stator sections or portions of the machine are so arranged in respect to one another as to produce a plurality of airgaps in series with one another. In these prior machines, a plurality of coil windings are carried by the plurality of stators respectively, so that, for every airgap exhibiting magnetic reluctance, a coil winding is provided adjacent thereto for generating a magnetomotive force across said gap. In this way, flux is caused to pass in directions generally parallel to the central shaft of the machine upon which said rotors are mounted, and any number of airgaps and rotors may be placed in series with one another without impairing the field density. The rotor sections are, as mentioned, carried on a shaft extending axially through the machine and having its opposing ends mounted in bearings adjacent end bells disposed at the opposed ends of the machine; and cooling of the various machine sections may be achieved by creating a current of air passing through the machine, due, for example, to the natural blower action of the rotors, said cooling air being expelled in generally radial directions between the adjacent rotors and stators, i.e., through the aforementioned airgaps.

In the forms of such axial airgap machines described in my prior patents, each stator section is provided with a coil or with winding means generating a magnetomotive force. The plurality of windings sets thus provided, one set for each stator, places a practical limitation upon the minimum size and weight which the machine can assume and still produce a useful torque. The present invention, recognizing these limitations resulting from the use of windings on each stator section, overcomes such limitations and permits axial airgap machines of even smaller sizes and weights to be fabricated, through the elimination of some of the windings and supporting pole pieces considered necessary heretofore. More particularly, as will appear hereinafter, the present invention contemplates the provision of axial airgap machines of the general types described in my prior patents, characterized by the provision of one or more stator sections which have no coil windings thereon. Magnetic poles are nevertheless generated in these windingless stator sections by practical application of a known phenomenon that, when a magnetic pole is in close proximity to a ferrous metal, it generates an opposing pole in that metal. The magnetomotive force which would otherwise be generated by the eliminated winding is effectively retained in my new machines by having the winding or windings, actually provided therein, carry heavier loads than is the case in my prior patents. As a result of this overall arrangement, the number of poles generated in a machine having a given number of stator and rotor sections remains the same as before, but these poles are generated by fewer windings than has been considered necessary heretofore, thereby permitting the machine to be reduced in size and weight beyond that contemplated by the forms shown, for example, in my prior Patents Nos. 2,479,589 and 2,734,140.

It is accordingly an object of the present invention to provide axial airgap machines of simplified construction.

Another object of the present invention resides in the provision of axial airgap machines, e.g., motors and generators which may be fabricated less expensively than has been the case heretofore.

A still further object of the present invention resides in the provision of axial airgap machines having reduced size and less weight, achieved by making more efficient use of the materials and structures constituting the machine.

A still further object of the present invention resides in the provision of simplified axial airgap motors and generators characterized by the provision of one or more windingless stators, so arranged that the torque of the machine is not significantly reduced notwithstanding the elimination of windings in the machine.

In providing for the foregoing objects and advantages, the present invention contemplates the provision of an axial airgap machine having a plurality of spaced alternately positioned stator and rotor sections forming air gaps therebetween, in conjunction with means for generating magnetomotive forces across said gaps as has been the case in my prior patents. The magnetomotive force generating means in the present invention constitutes coils carried by one or more of the stator sections; but, in distinction to the arrangements of my prior patents, the present invention also provides stator sections having no windings thereon. The magnetic poles in these windingless stator sections, operative to generate a magnetomotive force across an adjacent gap, are generated by induction from poles generated in one or more wound stator sections of the machine. In effect, therefore, a further reduction in the size and weight of axial airgap machines constructed in accordance with the present invention is effected by eliminating some of the windings and supporting pole pieces which had been considered necessary in the past; and most of the magnetomotive force generated by these missing windings is nevertheless retained by having the remaining stator winding or windings carry heavier loads. As a result, the operational characteristics of the machine are not significantly impaired even though the construction of the machine is greatly simplified.

Other advantages are achieved by the arrangement of the present invention. For example, when two or more wound stators are provided in series, as proposed in my prior U.S. patents identified above, it is possible to reach magnetic saturation of the rotors fairly easily. This put a practical limit on the torque that each rotor is capable of generating. Having fewer stators with windings thereon does not reduce the torque substantially, provided, of course, that the remaining wound stator or stators produce sufficient magnetomotive force to bring the rotor near a point of most efficient operation.

The magnetic poles are not reduced in number, even though some of the machine stator portions carry no coils, and comprise windingless rings of material or stacks of laminations placed adjacent to similar such rings or stacks on the wound stator. Not having windings on all stators does result in slightly unequal field density between successive airgaps; but this unequal field density situation does not cause any difficulty in an axial airgap machine of the type here involved. This is in marked distinction to machines of conventional design where one weaker pole can result in greatly increased losses in the rotor and in windings associated with stronger fields.

I have further discovered that the power potential of an axial airgap machine of the type here involved, e.g., an axial airgap motor, increases with the number of airgaps and rotors provided in the overall machine. Thus, having more rotors and stators increases the power output even though the added rotors and stators have no windings thereon. This effect is due to the increased number of magnetic poles generated adjacent to the additional rotors, with these additional poles exerting a pull on the added rotors. A motor constructed in accordance with the present invention may, therefore, comprise only one wound stator, or a few wound stators, associated with a comparatively larger number of rotors (e.g., four rotors associated with one wound stator and other unwound stators disposed between the rotors, plus unwound stators on the ends of the machine); and the power output of the machine is thus increased even though the number of windings is not increased. Of course, as the number of rotors is increased, in relation to the number of unwound stators provided between such rotors, the contribution to the overall torque of the machine, effected by these rotors, is reduced, i.e., the number of unwound stators cannot be increased without limit. A point is reached in which the gain is so diminished as to make further increase in the number of rotors uneconomical. However, within these limits, an increase in the power of the machine can be achieved by increasing the number of rotors provided, and by associating this increased number of rotors with unwound stators; whereby, an axial airgap machine of excellent performance characteristics can be manufactured at less cost, and in a smaller and lighter structure, than has been possible heretofore.

The foregoing objects, advantages, construction, and operation of the present invention will become more readily apparent from the following description and accompanying drawings, in which.

Figure 1:
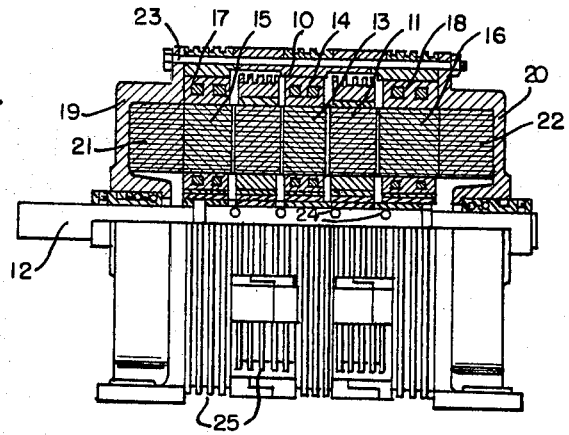
FIGURE 1 illustrates an axial airgap machine of the prior art, more particularly of the type shown in FIGURE 12 of my prior Patent No. 2,734,140.
Figure 3:
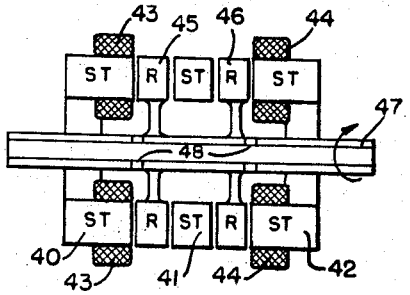
Figure 4:
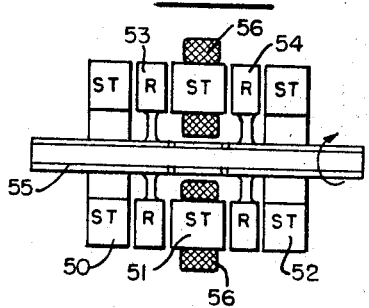
Figure 5:
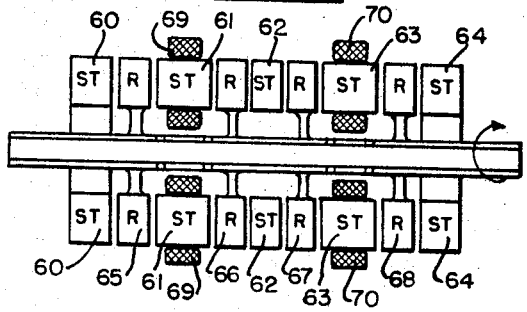
Figure 6:
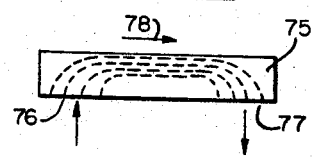

FIGURE 3 diagrammatically illustrates an improved form of axial airgap machine, corresponding to the arrangement shown in FIGURE 1, but employing only two wound stators rather than three wound stators;

FIGURE 4 illustrates a further embodiment of the present invention corresponding in general to the arrangement shown in FIGURE 1, but utilizing only a single wound stator;

FIGURE 5 illustrates a still further embodiment of the present invention wherein an increased number of rotor sections is employed in conjunction with various unwound stators and with only two wound stators; and FIGURE 6 diagrammatically illustrates a preferred material, i.e., grain oriented magnetic material, used in the stators of a machine constructed in accordance with the present invention.

Referring initially to FIGURE 1, it will be seen that the general organization of an axial airgap machine constructed in accordance with the prior art (e.g., in accordance with my prior Patent No. 2,734,140) may comprise a pair of ring-shaped rotors 10 and 11 mounted upon a shaft 12 in spaced relation to one another, and separated from one another by an intervening ring-shaped stator 13 having a winding set 14 thereon. The overall construction of the stator, including its windings, is more fully described in my prior Patent No. 2,734,140. The rotors 10 and 11 (also preferably constructed in accordance with my prior Patent No. 2,734,140) are further associated with an additional pair of stators 15 and 16, having windings designated 17 and 18, respectively, thereon. End bells 19 and 20 are provided at the opposed ends of said machine, with said end bells containing laminated rings 21 and 22 formed of an appropriate magnetic material; and the inner surfaces of said rings 21 and 22 are ground smooth so as to achieve a good magnetic bond between said rings 21 and 22 and the adjacent contiguous stators 15 and 16 which act in effect as pole pieces at the opposing ends of the machine.

The overall machine, comprising the aforementioned end bells, magnetic rings, wound stators, and rotors, may be maintained in assembled relation by any appropriate means, e.g., by bolts such as 23. In the particular prior art form of structure shown in FIGURE 1, the shaft 12 is hollow and is provided with a plurality of apertures 24 operative to direct air passing through the hollow shaft 12 into general radial paths extending between the alternately disposed stator and rotor sections, thereby to effect cooling of the machine. Such cooling may be enhanced by providing heat radiating ribs 25 adjacent the external peripheries of the several rotor and stator sections.

The detailed construction of the machine shown in FIGURE 1, and possible methods of forming the various rotors and stators thereof, is discussed in my prior Patent No. 2,734,140; and these constructional features do not in themselves constitute the present invention. It will be noted, however, that in the arrangement shown in FIGURE 1, depicted as typical of the prior art, there are a plurality of airgaps positioned between the several rotor and stator sections; and a coil winding is provided adjacent each such airgap. More particularly, it will be seen that the arrangement of FIGURE 1 constitutes, in effect, three spaced stator sections 13, 15, 16 having two intervening rotor sections 10, 11 forming a total of four airgaps; and the three stator sections all carry coil windings thereon so that any one coil provides a magnetomotive force across at least one adjacent airgap.

The present invention contemplates a machine which embodies the same general organization and construction as the machine of FIGURE 1. However, in distinction to this prior art type of construction, the present invention achieves the various advantages described earlier by eliminating one or more stator coil windings, e.g., the machine of the present invention eliminates windings such as 14 previously associated with the central stator section, or eliminates windings such as 17 and 18 previously associated with the end stator sections. The windings which remain, in whatever particular configuration is chosen, preferably carry heavier loads, thereby producing a machine having substantially the same performance characteristics, and indeed, increased performance characteristics in some embodiments, notwithstanding the fact that the machine can be made less expensively, in smaller sizes, and with less weight, than has been typical heretofore.

Figure 2:
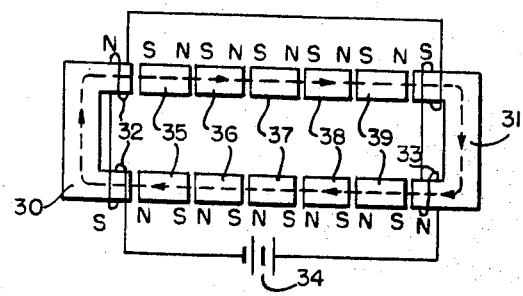
FIGURE 2 is a diagrammatic illustration depicting the fundamental principles of the present invention.

The principle upon which the improved structure of the present invention is based is diagrammatically illustrated in FIGURE 2. More particularly, it is well known as a general proposition, that if an electromagnet is disposed adjacent a piece of high permeability material, such as iron, in such manner that the magnetic lines of force generated by said electromagnet pass through said high permeability material, a magnetic pole (or poles) will be induced in said piece of high permeability material adjacent to the poles of the electromagnet and of opposite polarity thereto. In the diagrammatic arrangement of FIGURE 2, for example, two U-shaped electromagnets 30 and 31 are provided, having windings 32 and 33 thereon. Windings 32 and 33 are energized from a current source 34 operative to generate poles of opposite polarity designated N and S, respectively, adjacent the opposing ends of each said electromagnet 30 and 31.

If now a plurality of pieces of high permeability material 35 through 39 inclusive are placed in spaced alignment with one another, and in line with the poles of electromagnet 30 and 31, a completed magnetic circuit will be produced, comprising the electromagnets 30 and 31, the various magnetic pieces 35 through 39, and the intervening airgaps; and flux passes through this magnetic circuit along the path generally indicated by broken lines in FIGURE 2. As the flux passes through the several pieces 35 through 39, magnetic poles will be induced or generated in each such piece, as designated by the letters S and N adjacent each piece 35 through 39; and the resulting poles will be alternately of opposite polarity. Each piece, such as 35, thus has two opposite polarity poles generated therein, just as would be the case if a winding were placed on the piece and energized by a current source; and this pole generation is achieved in the pieces 35–39 even though no windings are actually provided on said pieces.

The principle illustrated in FIGURE 2 may be applied, in practice, to form an axial airgap machine generally of the type described in reference to FIGURE 1, but exhibiting the various improvements discussed earlier. One such practical application is illustrated in FIGURE 3. In this form of the invention, the elements 40, 41, and 42 (bearing the legends ST) diagrammatically depict the stators of an axial airgap motor corresponding to the stator arrangement 15, 13, 16 of FIGURE 1. In distinction to the arrangement of FIGURE 1, however, stators 40 and 42 alone carry windings, designated 43 and 44, respectively; and the central stator 41 consists entirely of stacks of laminations made of grain aligned silicon steel but having no windings thereon.

The spaced stator sections 40, 41, and 42 are associated with intervening rotors 45 and 46 fabricated of similarly grain aligned or grain oriented stacks of magnetic material; and said rotors 45 and 46 are surrounded by electrical conductors (not depicted) which, in the case of induction motors, may take the form of aluminum cast around the stacks of laminations or may consist of coil windings leading to slip rings. The stacks of laminations in each of stator sections 40, 42 may be held in place by a plastic material, poured around the stators after the windings 43, 44 are placed thereon; and a similar such procedure may be employed to hold together the laminations of windingless stator 41. These constructional features are more fully described in my prior Patent No. 2,734,140, incorporated herein by reference.

The ring-shaped rotor sections 45 and 46 are mounted in spaced coaxial relation to one another on a rotatable shaft 47 extending along the axis of the machine. The shaft 47 may, if desired, be hollow in configuration, and may include apertures 48 adapted to direct cooling air, generated by the normal blower action of the rotors, through the gaps between the several aligned ring-shaped stator and rotor sections. This particular shaft configuration, and the form of cooling described, does not in itself constitute the present invention, however, and variations may be made therein, e.g., the cooling structure may take the form illustrated in my prior Patent No. 3,277,323 issued Oct. 4, 1966 for "Axial Airgap Machines and Improved Cooling System Therefor."

The number of rotor and stator sections shown in FIGURE 3 correspond to the number of rotor and stator sections shown in FIGURE 1. In the FIGURE 3 arrangement, however, since the central stator 41 does not have windings thereon, the total number of windings in the FIGURE 3 embodiment is less than that in the FIGURE 1 arrangement. The system is nevertheless completely operative due to the fact that poles are generated in the unwound stator 41 in accordance with the principles previously described in reference to FIGURE 2.

A still simpler form of the invention is shown in FIGURE 4. The arrangement again comprises three stator sections 40, 51 and 52 spaced from one another and associated with a pair of intervening rotors 53 and 54 mounted upon a central shaft 55. In this particular embodiment of the invention, all of the magnetomotive force generating windings are carried by the central stator 51, as designated at 56; and the end stators 50 and 52 are simply made of a grain oriented silicon steel ribbon wound to form a solid ring. The FIGURE 4 embodiment thus uses only one set of windings, as compared with the three sets utilized in the FIGURE 1 arrangement; and notwithstanding the fact that the resulting construction is less expensive than that shown in FIGURES 1 or 3, the FIGURE 4 arrangement nevertheless produces substantially the same torque.

In some circumstances, the FIGURE 3 arrangement may be preferred over the FIGURE 4 arrangement, notwithstanding the reduction in number of windings effected in the FIGURE 4 embodiment of the invention. More particularly, the FIGURE 4 arrangement is not as easily cooled as the arrangement shown in FIGURE 3, or as is the case in arrangements analogous to FIGURE 3 wherein the outermost stators carry windings thereon. As has been mentioned previously, and as is more fully described in my prior patents identified above, most of the cooling is done by air forced through the gaps between the stator and rotor sections in generally radial directions. If the outside stators are wound, as in the FIGURE 3 embodiment, a large external surface is provided on the outside of the end stators tending to radiate heat and thereby effecting greater cooling, in conjunction with the radially expelled air, than is the case in the FIGURE 4 arrangement. When the central stator only is wound, as in FIGURE 4, heat is radiated from the outer surface of this stator alone, i.e., heat is radiated from the relatively narrow ring forming the outermost periphery of wound stator 51, 56. This heat radiating area is much smaller than the area provided by end bells such as have been described in reference to FIGURE 1, and normally associated with the end stators such as 50 and 52. The amount of cooling exected by radiation is accordingly less in the FIGURE 4 embodiment than in the FIGURE 3 embodiment. The outermost surface of stator 51 can, of course, be ribbed in the manner previously described in reference to FIGURE 1; and while this does increase the cooling area, it still does not equal the effect of end bell cooling.

It must be remembered that, in machines of the types here involved, the amount of iron employed is only a fraction of that employed in conventional machines; and the total iron losses are accordingly reduced in similar proportion. For this reason, it is permissible to bring the iron nearer to saturation. The copper losses are not reduced in the same way however, although they may be reduced by the simple expedient of increasing the cross section of the conductors.

In addition to the arrangements shown in FIGURES 3 and 4, still other combinations of wound and windingless stators are possible. More particularly, and as has been discussed earlier, the number of rotors can be increased within limits, thereby to increase the power potential of the machine even though the number of windings is not increased. One such arrangement is shown in FIGURE 5. In this particular arrangement, a total of five stator sections 60 through 64 inclusive are provided in spaced relation to one another; and these five stator sections are associated with four intervening rotor sections 65 through 68 inclusive. Only two of the five stator sections, namely, stators 61 and 63 carry windings thereon, these windings being illustratively depicted at 69 and 70. The remaining three stators, 60, 62, and 64 carry no windings thereon. The arrangement of FIGURE 5 is thus similar to an arrangement wherein two FIGURE 4 assemblies are placed end to end, with a common unwound stator being shared by the two end to end assemblies adjacent the center of the resulting structure. Such an assembly provides a substantial saving in mass and cost, without impairing the torque of the machine.

In each of the embodiments described in reference to FIGURES 3, 4, and 5, the end stators may be made of a grain oriented ribbon wound to form a ring. The advantages of employing such grain orientation is depicted symbolically in FIGURE 6. The poles of the end piece 75 (FIGURE 6) occur at the places where the magnetic lines of force enter and leave the structure, i.e., at locations 76 and 77. At these places, the lines of force are at right angles to the grain orientation, said grain orientation being indicated by the arrow 78. At the entry and exit portions of the piece 75, therefore, the higher permeability of the grain oriented material is not effectively utilized. However, the overall pole surface is large in comparison with the cross section of the ring. Therefore, the material is farther from saturation at these entry and exit portions than is the case in the middle of the ring where the magnetic lines are parallel to the orientation. Where the greatest concentration of lines exist, i.e., in the middle of the pole piece, the grain orientation is parallel to the lines of force; and in this region, therefore, the magnetic material is capable of carrying a greater concentration of flux without becoming saturated. As a consequence, by using grain oriented steel, the width of the ring in the axial direction may be made less than would be the case with ordinary non-oriented materials. This advantage becomes all the more important as the number of poles are reduced. For example, a greater saving of material is achieved in two pole machines than is achieved in four pole machines.

The advantages to be achieved from grain oriented materials are not confined to the use of such materials in the end stators; and similar advantages occur when grain oriented material is employed in wound middle stators, e.g., of the types shown in FIGURES 4 and 5. As was mentioned earlier, as the number of unwound stators is increased, the field density reduces in those portions of the machine which are progressively further away from the wound stator. Consequently, in a central wound stator machine of the type shown in FIGURES 4 and 5, the field density is greatest in the region of the coil windings, and decreases in directions away from the wound stators and toward the unwound stators. The design of the machine is such, however, that this highest field density is in a direction parallel to the grain orientation when the wound stators employ grain oriented fields; and this, therefore, takes full advantage of the increased permeability and greater field carrying capacity of the material throughout the machine.

While I have thus described preferred embodiments of the present invention, many variations will be suggested to those skilled in the art, and certain of these variations have already been discussed. It must, therefore, be understood that the foregoing description is meant to be illustrative only and should not be considered limitative of my invention; and all such variations and modifications as are in accordance with the principles described are meant to fall within the scope of the appended claims.

Having thus described my invention, I claim:

1. An axial airgap dynamo-electric machine comprising a plurality of coaxial generally ring-shaped rotors mounted in spaced relation to one another on a central rotatable shaft disposed along the common axis of said rotors, a plurality of generally ring-shaped stators mounted in spaced generally coaxial relation to one another about said shaft, said stators being respectively positioned in intervening relation to said spaced rotors with a pair of said stators being located, respectively, at the opposing ends of said array of alternately positioned rotors and stators, said stators including at least one stator of the wound type having coil means thereon operative to generate a magnetomotive force producing magnetic flux passing through said rotors and stators in directions generally parallel to said shaft and passing through said end stators in directions transverse to said shaft, said stators including at least one stator of the unwound type comprising magnetic material having no coil means thereon and responsive solely to flux passing therethrough to generate a pair of spaced magnetic poles of opposite polarity, said wound and unwound stators being disposed alternately with respect to one another in a direction along the axis of said machine with each unwound stator being positioned adjacent to a wound stator.

2. The machine of claim 1 wherein said plurality of stators comprise three stators spaced from one another, said plurality of rotors comprising two rotors positioned respectively in the spaces between adjacent ones of said three stators.

3. An axial airgap dynamo-electric machine comprising two coaxial generally ring-shaped rotors mounted in spaced relation to one another on a central rotatable shaft disposed along the common axis of said rotors, three generally ring-shaped stators mounted in spaced generally co-axial relation to one another about said shaft, said stators being respectively positioned in intervening relation to said spaced rotors with a pair of said stators being located, respectively, at the opposing ends of said array of alternately positioned rotors and stators, the two outermost ones of said three stators having coil means thereon operative to generate a magnetomotive force producing magnetic flux passing through said rotors and stators in directions generally parallel to said shaft and passing through said end stators in directions transverse to said shaft, the intermediate one of said three stators comprising magnetic material having no coil means thereon and responsive solely to flux passing therethrough to generate a pair of spaced magnetic poles of opposite magnetic polarity.

4. The machine of claim 2 wherein the middle one only of said three stators has said coil means thereon.

5. An axial airgap dynamo-electric machine comprising a plurality of coaxial generally ring-shaped rotors mounted in spaced relation to one another on a central rotatable shaft disposed along the common axis of said rotors, five generally ring-shaped stators mounted in spaced generally coaxial relation to one another about said shaft, said stators being respectively poistioned in intervening relation to said spaced rotors with a pair of said stators being located, respectively, at the opposing ends of said array of alternately positioned rotors and stators, coil means on alternate ones of said five stators, said coil means being operative to generate a magnetomotive force producing magnetic flux passing through said rotors and stators in directions generally parallel to said shaft and passing through said end stators in directions transverse to said shaft, the remaining ones of said stators comprising magnetic material having no coil means thereon whereby a windingless stator is disposed between a pair of wound stators and is responsive solely to flux passing therethrough to generate a pair of spaced magnetic poles of opposite magnetic polarity.

6. An axial airgap dynamo-electric machine comprising another, said rotors and stators being respectively posi-relation to one another about said shaft, said rotors and stators each having pole faces, the pole faces of said rotors and stators being generally in alignment with one ring-shaped stators mounted in spaced generally coaxial an even number plurality of coaxial generally ring-shaped rotatable shaft, an odd number plurality of generally tioned in alternate relation to one another, a pair of said stators being located, respectively, at the opposing ends of said array of alternately positioned rotors and stators, at least one of said stators being of the wound type having coil means thereon operative to generate a magnetomotive force producing magnetic flux passing through said rotors and stators, and at least one other of said stators being of the unwound type comprising magnetic material having no coil means thereon and responsive solely to flux passing therethrough to generate magnetic poles at the pole faces thereof, each of said unwound stators having a wound stator next adjacent thereto in the axial direction of said machine.

7. In an axial airgap dynamo-electric machine of the type comprising a plurality of rotors and a plurality of stators mounted in alternate relation to one another about a central shaft, the improvement which comprises winding means disposed on less than all of said stators to produce wound stators operative to generate a magnetomotive force effecting flux through said rotors and through at least one windingless stator whereby said windingless stator has its magnetic poles induced therein by said flux, said wound and windingless stators being interleaved with one another alternately in a direction along the axis of said machine to position a wound stator adjacent one side of each rotor and an unwound stator adjacent the other side of each said rotor.

8. The improvement of claim 7 wherein said plurality of stators comprises an odd number of stators, said plurality of rotors comprising an even number of rotors, a pair of said stators being located respectively at the opposing ends of said alternately disposed stators and rotors, said pair of stators each being of the windingless type.

9. The improvement of claim 7 wherein said plurality of stators comprises an odd number of stators, said plurality of rotors comprising an even number of rotors, a pair of said stators being located respectively at the opposing ends of said alternately disposed stators and rotors, said pair of stators each being of the wound type.

10. In an axial airgap dynamoelectric machine, a plurality of generally ring-shaped rotors and a plurality of generally ring-shaped stators mounted in spaced interspersed relation to one another about a central shaft, winding means on at least one, less than all, of said stators operative to generate a magnetomotive force producing magnetic flux passing through all of said rotors and stators, at least one other of said stators being of the windingless type having no coil means thereon and being responsive solely to the flux passing therethrough to generate magnetic poles therein, said wound and windingless stators being spaced from one another along the axis of said machine in alternate positions relative to each of said rotors whereby each rotor has a wound stator on one side of said rotor and a windingless stator on the other side of said rotor.

References Cited
UNITED STATES PATENTS

| | | | |
|---|---|---|---|
| 1,211,617 | 1/1917 | Neuland. | |
| 2,873,395 | 2/1959 | Kober | 310—112 |
| 3,169,204 | 2/1965 | Moressee | 310—268 |
| 3,172,028 | 3/1965 | Dechet | 318—327 |

J. D. MILLER, *Primary Examiner.*

R. W. TEMPLETON, *Assistant Examiner.*

U.S. Cl. X.R.

310—112, 134